United States Patent [19]

Runnells et al.

[11] 4,179,813

[45] Dec. 25, 1979

[54] DENTAL INSTRUMENT DELIVERY SYSTEM

[75] Inventors: Robert R. Runnells, Kaysville; John C. Schmoegner, Kearns, both of Utah

[73] Assignee: MDT Instrument Company, Tualatin, Oreg.

[21] Appl. No.: 890,652

[22] Filed: Mar. 20, 1978

[51] Int. Cl.[2] .......... A61C 19/02

[52] U.S. Cl. .......... 433/79; 433/78

[58] Field of Search .......... 32/22

[56] References Cited

U.S. PATENT DOCUMENTS 3,271,860 9/1966 Burton .......... 32/22

3,667,124 6/1972 LaForce .......... 32/22

3,755,899 9/1973 Betush .......... 32/22

*Primary Examiner*—Robert Peshock

*Attorney, Agent, or Firm*—Trask & Britt

[57] ABSTRACT

A dental instrument delivery system of the type in which hand pieces are stored at the front edge of an instrument deck and are connected to utilities by means of flexible tubes with coiled memories is provided with structure to contain and support the weight of the tubing. The hand pieces may be held by removable hangers of heat resistant material so that the hangers may be separately sterilized. The instrument deck may further be provided with a slidably mounted tray adapted for cantilever suspension from either side of the deck.

25 Claims, 4 Drawing Figures

DENTAL INSTRUMENT DELIVERY SYSTEM

RELATED APPLICATIONS

This application describes and claims a dental delivery system which incorporates as a novel feature of several embodiments a movable upper tray surface. This surface is carried by a tray mounted atop an instrument deck by means permitting the tray to be supported in cantilever relation from either side of the deck. Commonly assigned application Ser. No. 888,220, filed concurrently herewith, describes a suspension system particularly useful for mounting such an upper tray surface. The inventors of the present application are co-inventors with others of the suspension system described and claimed in the related patent application.

BACKGROUND OF THE INVENTION

1. Field

This invention pertains to dental instrument delivery systems, sometimes referred to as instrument centers. Specifically, this invention pertains to certain structural improvements to such delivery systems which enhance both the usefulness and convenience of such systems.

2. State of the Art

Modern dental offices include, as a portion of the operatory, apparatus commonly referred to as a dental instrument delivery system or an instrument center. Such dental instrument delivery systems customarily include an instrument deck adapted to hold hand pieces in a location convenient for easy location and selection by dentists during operating procedures. The deck is associated with valving and control devices to regulate the supply of utilities, such as vacuum, air and water to the various hand pieces associated with the deck. Often an upper tray surface is mounted atop the deck. The hand pieces may be removably held by a storage structure at the front edge of the deck, and are connected to sources of utilities by means of flexible tubing. This tubing permits a hand piece to be moved from its stored location in the deck for use in a dental procedure. The tubing is conventionally adapted to retract in some way when a selected hand piece is returned to its stored location. In some instances, the tubing is retracted on a reel associated with the deck; however, a more recent practice is to provide the tubing with a coiled memory. That is, each hand piece is connected to the appropriate utility by means of a length of tubing which is normally coiled in its retracted or relaxed mode yet which is readily extendable. By "extendable", is meant that the tubing coils are straightened (or uncoiled) without undue effort when the hand piece is removed from the deck and moved to a location remote from the deck. Tubing is commercially available with coiled memory which persists after years of repeated extensions and retractions of this kind.

The upper tray surface of conventional dental decks is either flat or formed as an indented recess adapted to receive a loose tray. The upper deck surface is a convenient location for loose articles. The loose tray is preferred because it can be conveniently removed and replaced. Interchangeable trays may be prearranged to contain the articles required for a particular patient. Moreover, it is desirable practice for the removable trays to be sterilized before being reused. Convenient use of the upper tray surfaces has been somewhat hampered in the past by the necessity for reaching across the hand pieces stored at the front of the dental deck.

A problem encountered by the dental delivery systems of the prior art is the inconvenience or inability to sterilize the structures which hold the dental hand pieces. Placement of a hand piece into a recepticle necessarily carries contamination from a patient back to the dental deck. Available instrument delivery systems make no provision for heat sterilization of these recepticles or instrument hangers.

The flexible tubing with coiled memory conventionally used with modern day dental delivery systems, although quite advantageous from the standpoint of trouble free retraction, has several drawbacks. For example, the typical arrangement in use places an array of hand pieces at the front edge of the instrument deck. The several hand pieces are connected to utility sources by approximately parallel lengths of flexible tubing with coiled memory suspended from the back and beneath the deck. Accordingly, it is not uncommon for the coils of adjacent lengths of tubing to become entangled. Also, because the tubing is suspended from one end by the instrument deck and the other end from the hand piece, the dentist senses the entire weight of the tubing length at the hand piece. Moreover, practical tubing lengths; that is, sufficient to permit a dentist to perform necessary operative procedures, are necessarily also sufficiently long that if a dental hand piece is inadvertently dropped, it will inevitably strike the floor.

It has been found that dental decks currently in use can be intimidating to a patient. Usually the deck is located in the close proximity of the patient, and the patient develops the apprehension that any movement of his body may bring him into contact with the array of hand pieces stored along its front edge. In fact, such contact can occur and is undesirable.

SUMMARY OF THE INVENTION

The present invention provides a dental instrument delivery system of improved structure and arrangement which solves many of the problems and avoids most of the inconveniences associated with the prior art systems. A major improvement of the claimed dental instrument delivery system is the provision of individual chambers or channels within which the individual lengths of tubing with coiled memory are housed. This structure comprises a bottom tray member which is secured beneath the instrument deck to house and support the lengths of tubing. The bottom tray member has an opening proximate the hand piece storage structure carried at the front edge of the instrument deck so that each length of tubing passes through that opening to connect to a hand piece. Thus, as a hand piece is moved from the storage structure to a patient, the length of tubing is extended (that is the coils are stretched open) through the opening. When the hand piece is returned to the storage structure, the tubing length associated with it effects a retraction (that is the coils reform in the tubing length, thereby reducing its effective length) so that the length automatically returns to within its storage location atop the bottom tray member.

The bottom tray member may be integral with the instrument deck, forming a portion of an enclosure for the dental instrument delivery system. In certain embodiments, however, the bottom tray is removably fixed beneath the instrument deck to facilitate its removal and cleaning. In either event, it is preferred that the bottom tray be segmented into channels so that each channel receives and contains a separate length of tubing. In this fashion, the individual lengths are segregated to avoid the entanglements of adjacent lengths common to the prior art devices.

It is also preferred that the dental instrument system of this invention include a front bumper surface to isolate the hand pieces from a patient. The function of this bumper surface is partly physical and partly psychological in that not only are the instruments protected by this bumper surface but its presence tends to put a patient more at ease. Although the bumper surface may be provided in various configurations, preferably it is carried as a portion of the aforementioned bottom tray, usually at the peripheral edge of a lip depending from the aforementioned opening so that the bumper surface is positioned below and forward of the opening. The array of hand pieces is then located above and somewhat behind the bumper surface.

To facilitate storage of the individual lengths of flexible tubing, it is preferred to configurate the bottom tray to provide enlarged storage chambers towards the rear of the tray. Ideally, storage is provided by means of a sloping tray bottom so that the chamber is defined as a downward enlargement of the channel in which an individual length is stored.

It should be appreciated that one of the specific advantages offered by the storage channels of this invention is the support offered by the bottom of the channel to the tubing stored within. With the weight of the tubing bearing on this bottom, very little of the tubing weight is sensed at the hand piece by a dentist using the instrument. Moreover, because the front of the channel is located a considerable distance forward of the utility connection, if a hand piece is inadvertently dropped the tubing is supported at a midpoint thereby holding the hand piece clear from the floor. Of course, to realize this advantage, it is necessary to select a length of tubing appropriate for the height at which the dental instrument delivery system is mounted above the floor. In practice, the bottom tray of the system will rarely be positioned less than about three feet from the floor. In such cases, tubing lengths from about nine to twelve inches long in retracted condition are practical for both chair-mounted and wall-mounted dental instrument delivery systems. The extended length of this tubing is about five times its retracted (coiled) length. It has been found that the weight of a typical hand piece will extend a nine inch coil approximately 22 to 24 inches and a one foot coil to no more than about 32 inches.

Another improvement offered by the present invention is the inclusion of timer means mounted in direct association with the instrument deck. A dentist must often monitor elapsed time in connection with certain procedures. According to this invention, the timer is mounted on a panel surface which is visible from above the tray surface of the instrument deck. The timer may be either electronic or mechanical and is generally of the type which is preset for a selected time and gives an audible signal when that time has elapsed.

According to certain highly preferred embodiments of this invention, a hand piece storage structure mounted at the front edge of the dental instrument deck includes an array of hand piece hangers corresponding to the array of hand pieces associated with the hand piece storage structure. These hangers are constructed of heat resistant material, either metal or high temperature plastic, and are removable for heat sterilization. It is preferable that these hand piece hangers be interchangeable. In practice, when a hand piece is removed for sterilization, so is the hanger; and an interchangeable such hanger and hand piece are replaced in the storage structure and connected to the appropriate utility tubing. In this fashion, the probability of cross contamination between hand pieces from one patient to the next is reduced.

A particular benefit offered by certain embodiments of this invention is carrying the upper tray surface on a tray mounted atop the deck by means permitting the tray to be readily moved to extend from the deck in cantilever relation. That is, the tray, rather than being permanently positioned behind the array of hand pieces, may be readily moved to a location somewhat behind but off to one side of the hand piece array. Thus positioned, all of the articles located on top of the tray surface are more readily located by the dentist and/or dental assistant without the danger of brushing against the hand pieces. Ideally, this upper tray surface may be moved selectively to extend from either side of the deck. It is essential that the tray be mounted to the top of the instrument deck by suitable track means capable of suspending substantially the entire tray in cantilever fashion and providing rigid and stable support for the thus-cantilevered tray, even when the tray is loaded. Although various track means may be employed for this purpose, a particularly useful track for use is that disclosed by the aforementioned copending application Ser. No. 888,220, filed concurrently herewith. The disclosure of that application is hereby incorporated by reference to the extent is applicable hereto.

BRIEF DESCRIPTION OF THE DRAWINGS

In the drawings, which illustrate what is presently regarded as the best mode for carrying out the invention.

DESCRIPTION OF THE ILLUSTRATED EMBODIMENTS

Figure 1:
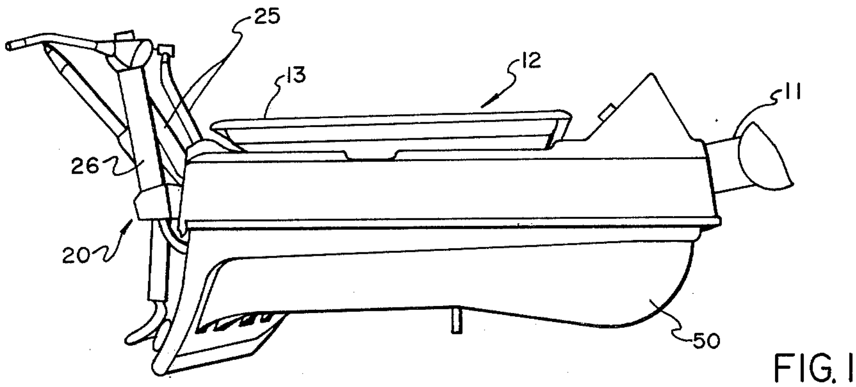
FIG. 1 is a pictorial representation of a dental instrument delivery system of this invention shown from one side.
Figure 2:
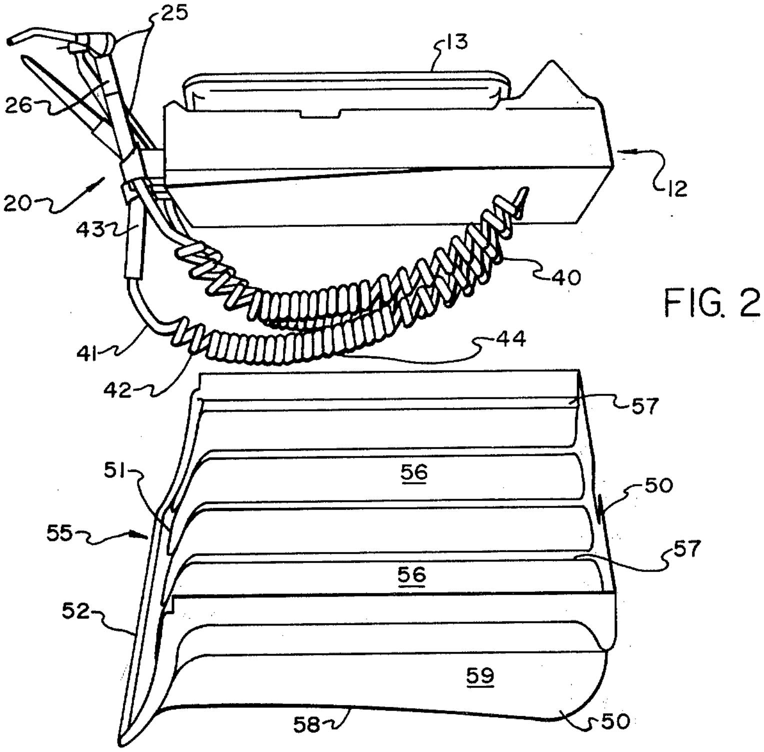
FIG. 2 is a similar view with the system partially disassembled to show the interior arrangement of certain components.
Figure 3:
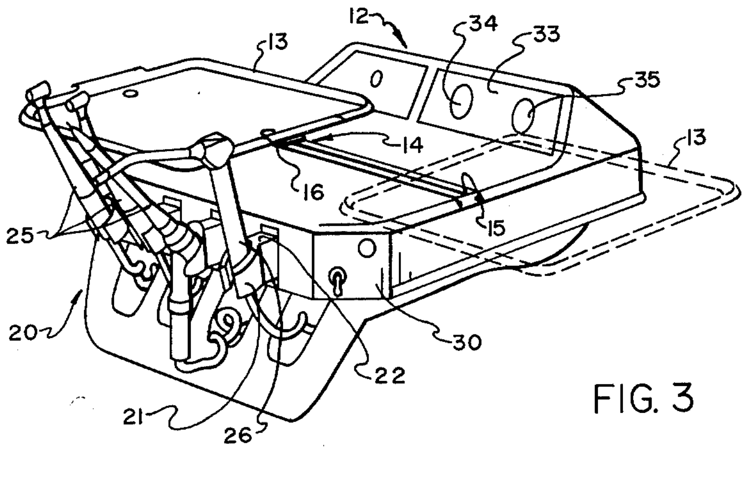
FIG. 3 is a pictorial representation of the same system showing upper tray structure in a first location in solid lines and in a second location in phantom lines.

FIGS. 1 through 3 illustrate a dental delivery instrument system of the present invention embodied as a chair mounted, over-the-patient delivery system. A portion 11 of the mounting structure is visible in FIG. 1. Of course, a system of this type may as readily be suspended from any suitable bearing surface, such as a wall. As is apparent from the drawing, the delivery system of this invention is constructed in more or less conventional fashion. It includes an instrument deck, designated generally 12, which has an upper tray surface 13 for the receipt of loose articles. As best shown by FIG. 3, the tray surface 13 is mounted atop the instrument deck 12 by means of a track system, designated generally 14. The track system 14 includes a first member 15 fixed to the deck 12 and a second member 16 slidably engaging the first member 15. These members are arranged to provide excellent support for the tray 13 as it is moved entirely to the left as shown in solid lines or to the right as shown in phantom lines.

Hand piece storage structure, designated generally 20, is located at the front edge of the deck 12, as shown. In the illustrated instance, this structure includes an array of instrument hangers 21 arranged in side-by-side relation and supported at the distal ends of a corresponding array of sport beams 22. In practice, these support beams 22 may incorporate valving and associated control systems for the hand pieces 25 and syringe 26 associated therewith. Controls 30 for coolant air and water for each hand piece are located as shown at the front of the deck 12 in the proximity of the hand pieces 25.

Figure 4:
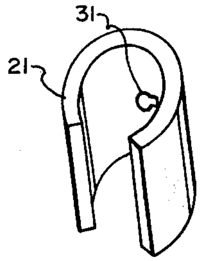
FIG. 4 is a pictorial representation of a removable hand piece hanger.

FIG. 4 shows an interchangeable hanger 21 removed from a beam 22 for sterilization. Means, such as the slot 31 shown, are provided to faciliate ready removal and attachment. The hanger may be structured from aluminum, stainless steel, or any of the high-temperature-resistant resins customarily used for instruments and hand pieces which must undergo high temperature sterilization. A panel 33 visible from above the tray 13 conveniently carries monitoring devices such as the air pressure gauge 34 shown. A notable feature of this invention is the inclusion of a timer 35 within this panel 33.

Referring specifically to FIG. 2, individual lengths 40 of flexible tubing with coiled memory connect each hand piece 25 and the syringe 26 to utility sources (not visible) at the rear of the instrument deck 12. Although this disclosure distinguishes between "syringe" and other instruments commonly referred to as "hand pieces", the term "hand piece" as used in the appended claims, is intended to include syringes or any other instrument stored at the front of the instrument deck and connected to a utility by a length of tubing. It should be noted that each of the lengths of tubing 40 includes a relatively straight end segment 41 which connects to an individual hand piece 25 or syringe 26. These straight segments 41 avoid interference by individual coils 42 in the close proximity of the handle portion 43 of an instrument (25, 26). Each length 40 has a noticeable sag 44 at its midregion.

A bottom tray 50, illustrated as removable (FIG. 2), is fixed beneath the deck 12 as best shown by FIG. 1. The bottom tray may be molded or otherwise formed of a resinous material, and desirably includes a depending lip portion 51 configurated as a front bumper at its periphery 52. The front of the tray 50 defines an opening designated generally 55. In the illustrated instance, the tray 50 and its opening 55 are segmented into individual channels 56 defined by walls or partitions 57 integral with the tray 50. The bottom 58 of the tray 50 slopes to the rear and down to form individual storage compartments 59 within each channel 56. When the tray is fixed to the deck 12, either permanently or removably as illustrated in FIG. 1, the sags 44 of the individual lengths 40 of tubing are supported by the bottom 58 of the tray 50.

Although the invention has been described with particular reference to certain details of the illustrated embodiment, such reference is not intended to restrict the scope of the claims which themselves recite those details regarded as essential to the several embodiments of the invention claimed herein. In particular, it should be recognized that the present invention provides a number of improvements each of which has utility in practice independent of any of the other novel features herein disclosed and claimed.

We claim:

1. In a dental instrument delivery system including an instrument deck with an upper tray surface for loose articles, a hand piece storage structure at its front edge removably holding an array of hand pieces of various types, and approximately parallel lengths of flexible tubing with coiled memory suspended from the back and beneath said deck and connecting individual said hand pieces to utility sources such that each length may selectively be extended by moving the hand piece connected to it from the storage structure and the memory of said length will effect a retraction of said length when the hand piece is returned to the storage structure; the improvement comprising a bottom tray member secured beneath said deck to house and support said lengths of tubing, said bottom tray member having an opening proximate said recepticle structure such that each said length of tubing passes through said opening to connect to a said hand piece.

2. An improvement according to claim 1 wherein said bottom tray includes a front bumper surface carried by a lip depending from said opening so that said bumper surface is positioned below and forward of said opening.

3. An improvement according to claim 1 wherein the bottom tray is segmented into channels, each channel containing a separate said length of tubing so that said lengths are segregated.

4. An improvement according to claim 3 wherein each channel includes a chamber at the rear to receive tubing of the length stored in said channel when the hand piece associated with that length is held in said storage structure so that said length is in its retracted condition.

5. An improvement according to claim 4 wherin said chamber is a downward enlargement of said channel.

6. An improvement according to claim 1 wherein said upper tray surface is carried by a tray mounted atop said deck by means permitting said tray to be moved to extend in cantilever relation from said deck.

7. An improvement according to claim 6 wherein said tray is mounted by means enabling the tray to be moved selectively to extend from either side of said deck.

8. An improvement according to claim 1 mounted at a selected distance above a floor wherein the said lengths of coiled tubing are selected in length such that if the hand piece connected to said length is suspended from that length thereby extending said length, the hand piece will be held by said length above and out of contact with the floor.

9. An improvement according to claim 1 wherein said bottom tray is removably attached beneath said deck.

10. An improvement according to claim 1 including timer means mounted in association with said deck.

11. An improvement according to claim 1 wherein said hand piece storage structure includes an array of hand piece hangers corresponding to said array of hand pieces, said hangers being constructed of heat-resistant material and removable for sterilization.

12. An improvement according to claim 11 wherein said hand piece hangers are interchangeable.

13. In a dental instrument delivery system including an instrument deck with an upper tray surface for loose articles and a hand piece storage structure at its front edge removably holding an array of hand pieces of various types in front of and above the elevation of said tray surface; the improvement wherein said upper tray surface is carried by a tray mounted atop said deck by means permitting said tray to be moved laterally without disturbing said hand pieces to extend in cantilever relation from said deck, thereby permitting access to said tray surface unobstructed by said hand pieces.

14. An improvement according to claim 13 wherein said tray is mounted by track means enabling the tray to be moved selectively to extend from either side of said deck.

15. An improvement according to claim 14 wherein said deck includes timer means installed in a panel surface visible from above said tray.

16. An improvement according to claim 15 wherein said hand piece storage structure includes an array of hand piece hangers corresponding to said array of hand pieces, said hangers being constructed of heat-resistant material and removable for sterilization.

17. An improvement according to claim 16 wherein said hand piece hangers are interchangeable.

18. A dental instrument delivery system according to claim 13 wherein said hand piece storage structure includes an array of hand piece hangers corresponding to said array of hand pieces, said hangers being constructed of heat-resistant material and removable for sterilization.

19. An improvement according to claim 18 wherein said hand piece hangers are interchangeable.

20. An improvement according to claim 18 wherein said deck includes timer means installed in a panel surface visible from above said tray.

21. In a dental instrument delivery system including an instrument deck with an upper tray surface for loose articles, a hand piece storage structure at its front edge removably holding an array of hand pieces of various types, and approximately parallel lengths of flexible tubing with coiled memory suspended from the back and beneath said deck and connecting individual said hand pieces to utility sources such that each length may selectively be extended by moving the hand piece connected to it from the storage structure and the memory of said length will effect a retraction of said length when the hand piece is returned to the storage structure; the improvement comprising support means beneath said deck to separately house and support each said length of tubing so that said lengths are segregated in stored condition, thereby avoiding entanglements of adjacent lengths.

22. An improvement according to claim 21 wherein said support means is integral with said instrument deck, and includes a plurality of channels, each of which receives and contains a separate said length of tubing.

23. An improvement according to claim 21 wherein said support means is a bottom tray segmented into channels, each of which receives and contains a separate said length of tubing.

24. An improvement according to claim 21 wherein said support means includes an opening proximate said receptacle structure such that each said length of tubing runs through said opening to connect to a said hand piece.

25. An improvement according to claim 24 wherein said support means includes a front bumper surface carried by a lip depending from said opening so that said bumper surface is positioned below and forward of said opening.

* * * * *